Patented June 17, 1930

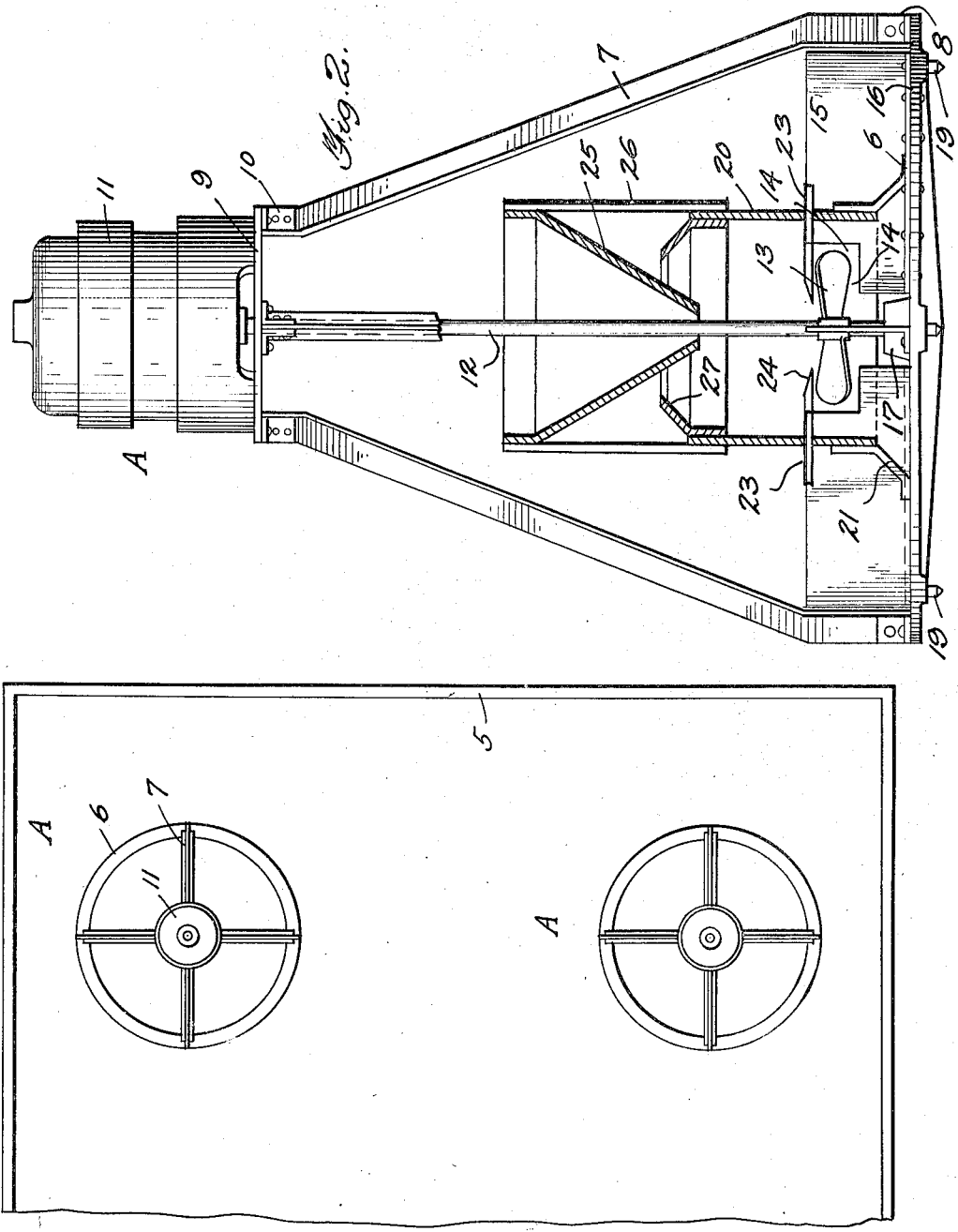

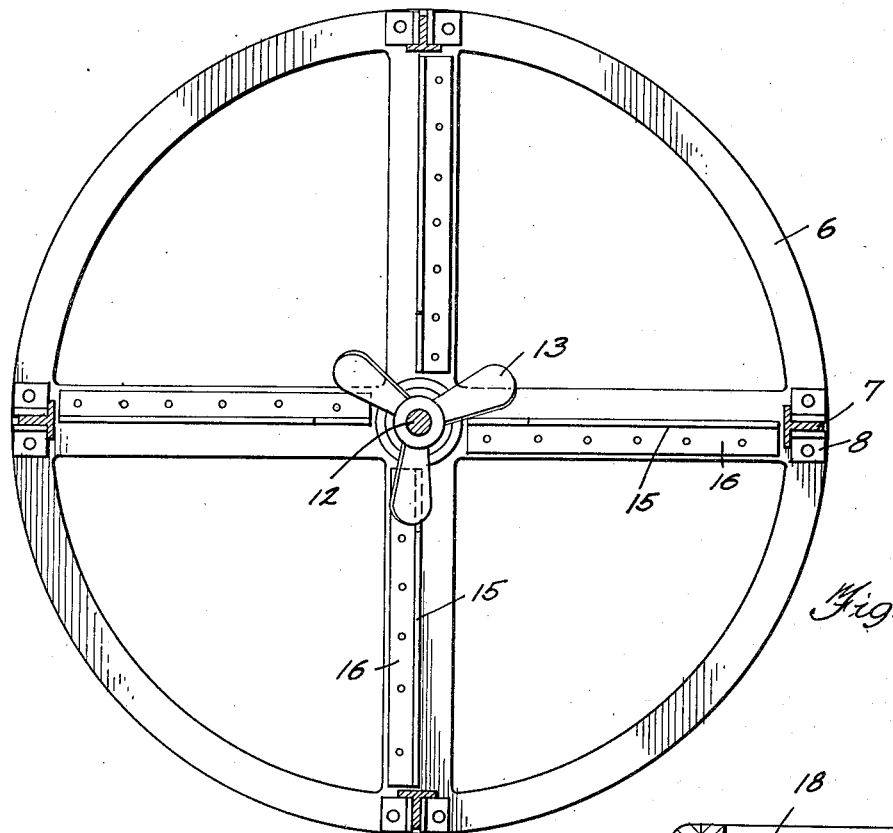

1,765,338

UNITED STATES PATENT OFFICE

WILLIAM N. JONES AND CHESTER C. HUMPHREYS, OF TAMPA, FLORIDA, ASSIGNORS TO ROTEX ENGINEERING COMPANY, A CORPORATION OF TENNESSEE

AGITATOR, AERATOR, AND MIXER

Application filed November 14, 1928. Serial No. 319,256.

This invention relates to an apparatus for aerating, agitating or, and, mixing liquids. Briefly stated, the invention resides in disposing, in a tank or other receptacle for liquid, one or more agitating units, comprising a rapidly rotating propeller, disposed in novel relation to suitable baffles, all as hereinafter more particularly described.

In the accompanying drawings:

Fig. 1 is a fragmentary diagrammatic view illustrating a plurality of units disposed in a a water tank, the structure of Fig. 3 which may or may not be employed, in conjunction with Figs. 1 and 2, being omitted.

Fig. 2 is a view, partly in side elevation and partly in section, of one of the power units, Fig. 3 is a horizontal sectional view taken just above the propeller and with the inspirator shell and associated parts, hereinafter described, omitted.

Fig. 4 is a detail sectional view of the bearing for the lower end of the propeller shaft, Fig. 5 is a detail vertical sectional view, illustrating an inspirator associated with the propeller, and Fig. 6 is a horizontal sectional view through the inspirator, showing the disposition of certain inlet pipes with respect to the propeller blades.

Like numerals designate corresponding parts in all of the figures of the drawings.

In the drawings, 5 designates a tank, or other receptacle, adapted to contain a body of liquid that is to be mixed, aerated or otherwise treated by agitation. One field in which we have found the present invention to be of particular value is in the aeration of water, as, for example, the aeration of the water supply of cities where water is to be aerated upon a large scale. The necessary capacity of aeration may be had by utilizing a plurality of agitating units, designated in Fig. 1, in a general way, at A. These units are all alike, and a description of one will serve as a description of all of them. Each unit comprises a base, which is in the form of a spider 6. Legs 7, which may be of T iron are secured to the outer ends of the legs of the spider by angle plates 8. A cap plate 9, which is secured to the upper ends of the legs 7, by angle plates 10, serve as the mounting and support for an electric motor 11. This motor is directly connected to propeller shaft 12. Shaft 12 carries a propeller 13, which is disposed to operate in the cutout portions 14 of baffle plates 15. Horizontal flanges 16, of these baffle plates, are secured to the legs of the spider 6. A boss 17, disposed at the center of the spider, receives a bronze bearing 18, in which the lower end of the propeller shaft 12 has an accurate mounting. The legs of the spider carry adjusting pins 19, by means of which the unit may be so adjusted that the propeller shaft will lie in a substantially vertical position. The disposition of the several propellers in the cutout portions of the baffles and below the tops of the baffles, prevents the rotation of the propellers from merely setting up a series of whirlpool actions, in the tank; these baffles checking this tendency to a whirlpool action and permitting the propellers to get such a hold on the water as to bring about violent agitation and aeration thereof.

When it is desired to introduce additional air, or any other gas or other fluid into the body of liquid being agitated, or otherwise treated, we contemplate the use of an inspirator, such as is illustrated in Figs. 5 and 6. This inspirator comprises a shell 20, which surrounds the propeller and propeller shaft, and which may be supported upon legs 21. This shell may be provided with any desired number of openings 22, through which small pipes 23 are led from a point above the surface of the liquid being treated to a point adjacent the outer ends of the blades of the propeller, where the pipes are beveled, as indicated at 24, in such way that they lie quite close to the line of travel of the propeller blades, the result being that, under the high speed of the propeller, a suction action is set up, which results in drawing air or other gases into the body of liquid in the tank.

A conical deflector 25 is supported in spaced relation to the upper end of the shell 20 by straps 26, and acts in conjunction with a vertically movable annular baffles 27.

Baffle 27 first directs the liquid toward the conical baffle, and the conical deflector deflects the liquid outwardly in all directions. The water level in Fig. 2 may be at any point above the top of the propeller, but the propeller is transversely disposed relatively close to the surface of the water. When the device of Fig. 5 is used, the water level is preferably at a point above the propeller and below the annular baffle 27.

By the method and apparatus herein shown and described, we have been able, under actual tests, to efficiently aerate the water supply of a city of considerable size. However, it is to be understood that the invention is not limited to the particular mechanical arrangement shown in the accompanying drawing, because it is clear that many changes may be made in the details thereof, without departure from the general idea. For example, the invention is not limited to the use of electric motors as the driving means, it being clear that any other prime mover may be utilized in this relation, such, for example, as a gasoline, steam, oil, or other engine. Further, while the direct connected motor provides a very simple and economical way of securing the desired results, it is clear that the interposition of gearing between the motor and the propeller shaft, or the driving of a plurality of the propellers from a single prime mover would be within the scope of the invention, and within the expected skill of the mechanic.

In operation, the propellers being driven at a high rate of speed, throw the water against the baffle plates, and this, together with the upward thrust of the propellers forces the water upward in the form of an inverted flat cone, at the same time breaking the liquid into spray, fine drops and a thin sheet, which in descending entrain air. Not only does the liquid entrain air but the violent action equally beats the air into the liquid. As this action is repeated again and again, the surface tension is broken again and again, and the same liquid is exposed to the air many times; thus all gaseous taste and odors are removed and replaced by oxygen, rendering the water, if water only is being treated, sweet and palatable.

Great flexibility is obtained by having each propeller unit self-contained, so that it may be moved from place to place in the basin, tank, stream, etc. The various units are capable of remote control; can be shut off independently of each other, and are economical of power. Under this system there is very little loss by evaporation, even in hot weather, and there is no loss on account of wind carriage of the water, as in certain spray types of aerators; and there is no damage to adjacent property by wind carriage.

While we have shown the aerators disposed in a tank, we contemplate using them in any stream, flume, or water way of any kind. The aerating action may take place while the fluid is either flowing or standing. In aeration or sewage disposal it is generally a moving body of liquid that must be treated.

It is to be understood that the invention is not limited to the precise construction set forth, but that it includes within its purview whatever changes fairly come within either the terms or the spirit of the appended claims.

Having described our invention, what we claim is:

1. A device of the character described, comprising a supporting frame consisting of a spider-like base, a vertical bearing at the center of the spider-like base, a propeller shaft journaled in the vertical bearing, a propeller carried by said shaft, a plurality of legs supported from the outer ends of the spider, a cap plate upon the upper ends of said legs, a prime mover for the propeller shaft mounted upon said cap plate, and a group of baffle plates supported upon the legs of the spider, about said propeller.

2. A device of the character described, comprising a supporting frame consisting of a spider-like base, a vertical bearing at the center of the spider-like base, a propeller shaft journaled in the vertical bearing, a propeller carried by said shaft, a plurality of legs supported from the outer ends of the spider, a cap plate upon the upper ends of said legs, a prime mover for the propeller shaft, mounted upon said cap-plate, and a group of baffle plates supported upon the legs of the spider, about said propeller, the inner, upper corners of said baffle plates being cut away for the reception of the propeller, and the outer edges of said baffle plates lying above the plane of rotation of the propeller.

3. A device of the character described, comprising a vertically disposed propeller shaft and propeller carried thereby, a plurality of baffle plates disposed therearound and cut out at their inner upper corners for the reception of the propeller, an inspirator comprising a shell surrounding said propeller that is open at its bottom, a pipe passing through the inspirator shell and terminating close to the line of travel of the propeller, means for rotating the propeller shaft, and a conical deflector through which the propeller shaft passes, which deflector is disposed in spaced relation to, but projects into the upper end of the inspirator shell.

4. A device of the character described, comprising a vertical shaft, a propeller carried thereby, a shell surrounding the propeller and a conical deflector disposed in spaced relation above, but projecting into the upper end of the shell, and so shaped and lying in such relation to the shell as to cause a liquid discharged upwardly through the shell, by the propeller, to be sprayed outwardly between the deflector and shell, and beyond the sides of the shell.

5. A device of the character described, comprising a vertical shaft, propeller carried thereby, a shell within which said propeller is disposed, a conical deflector disposed in spaced relation to the upper end of the shell, through which the propeller shaft passes, said deflector projecting into the upper end of the shell, and an inwardly converging baffle disposed in the upper end of the shell, about said conical deflector, as and for the purposes set forth.

6. Means for aerating a body of water consisting of a propeller disposed to rotate in a substantially horizontal plane beneath the surface of the water, and an upwardly divergent conical deflector disposed above said propeller and adapted to act to direct the water impelled upwardly by the propeller in an outwardly divergent spray entirely around its circumference, said propeller being so located with respect to the surface that the water is discharged upwardly in the form of a truncated cone, above said surface, and its surface tension is thereby continuously broken.

7. The combination with a body of water to be aerated, of a plurality of horizontally rotating propellers disposed at spaced intervals throughout the body of water and beneath the surface thereof and having their blades set to discharge upwardly, and a conical deflector disposed above each of said propellers and in such a relation thereto that the water discharged upwardly by the propellers is sprayed outwardly in all directions by said conical deflectors, said propellers being so located with respect to the surface that the water is discharged upwardly in the form of a plurality of truncated cones, above the surface, and at a plurality of points thereover, whereby the surface tension of the water is continuously broken at a plurality of points.

8. In a water aerating system, the combination with a container containing a body of water, of a plurality of independent units, each self-contained and adapted to be moved freely from place to place within the container, and each comprising a power unit, and a horizontally rotative propeller driven therefrom and disposed beneath the surface of the water at such a point that rotation of the propellers will force the water upwardly beyond the surface of said water in the form of truncated cones, whereby the surface tension of the water is continuously broken.

9. In a water aerating system, the combination with a container containing a body of water to be treated, of a plurality of units disposed at spaced intervals within the body of water and each comprising a horizontally rotative propeller, and means for driving the same, said propellers being disposed below the surface of the water, a deflector of inverted conical form above each of said propellers, and a baffle ring between each of said deflectors and its associated propeller, said baffle ring comprising an inwardly directed annular member adapted to discharge the water impelled upwardly by the propellers inwardly toward the conical deflector, said water being, in turn, discharged by said conical deflectors, outwardly, in all directions about its circumference, as and for the purposes set forth.

10. Means for continuously breaking the surface tension of a body of liquid which consists of a plurality of upwardly discharging propellers disposed beneath the surface of the liquid at such a point as to discharge the liquid upwardly in the form of truncated cones and above the surface thereof, inspirator shells surrounding said propellers, and inspirating pipes terminating adjacent the path of the travel of the propeller and through which a fluid is drawn, under the action of the propeller.

11. Means for continuously breaking the surface tension of a body of liquid, which consists of a plurality of upwardly discharging propellers disposed beneath the surface of the liquid in such proximity to the surface as to discharge the liquid upwardly and continuously break its surface tension at a plurality of points over the area of the surface of the liquid, shafts by which said propellers are carried projecting to a point above the surface of the liquid, and driving means for said shafts, disposed above the surface of the liquid.

In testimony whereof we affix our signatures.

WILLIAM N. JONES.
CHESTER C. HUMPHREYS.